United States Patent
Hyodo et al.

(10) Patent No.: US 9,033,220 B2
(45) Date of Patent: May 19, 2015

(54) PRODUCTION MANAGEMENT METHOD FOR STEEL TUBES AND PIPES

(75) Inventors: Shigetoshi Hyodo, Nishinomiya (JP); Satoshi Tsuyuguchi, Nishinomiya (JP); Kazuto Kubota, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/355,646

(22) PCT Filed: Aug. 10, 2012

(86) PCT No.: PCT/JP2012/070427
§ 371 (c)(1),
(2), (4) Date: Jul. 7, 2014

(87) PCT Pub. No.: WO2013/065379
PCT Pub. Date: May 10, 2013

(65) Prior Publication Data
US 2014/0312115 A1    Oct. 23, 2014

(30) Foreign Application Priority Data
Nov. 2, 2011    (JP) .................................. 2011-240742

(51) Int. Cl.
G06F 7/00 (2006.01)
G06K 7/00 (2006.01)
G06K 7/10 (2006.01)
G06Q 10/06 (2012.01)
(Continued)

(52) U.S. Cl.
CPC ................ *G06Q 10/06* (2013.01); *B21C 51/00* (2013.01); *G05B 19/128* (2013.01); *G05B 2219/31304* (2013.01); *G05B 2219/32049* (2013.01)

(58) Field of Classification Search
CPC ......... G06K 7/14; G06K 7/1439; B23G 1/02; B23G 1/225; B23G 1/52; G05B 19/4183; G05B 2219/32049
USPC ............... 235/376, 435, 454, 462.01–462.49; 700/159
See application file for complete search history.

(56) References Cited

U.S. PATENT DOCUMENTS 5,321,887 A * 6/1994 Boula ....................... 29/890.043
5,442,164 A * 8/1995 Adachi .................... 235/462.18
(Continued)

FOREIGN PATENT DOCUMENTS

JP        3-72296      3/1991
JP        5-75222      3/1993
(Continued)

*Primary Examiner* — Michael G Lee
*Assistant Examiner* — Laura Gudorf
(74) *Attorney, Agent, or Firm* — Clark & Brody

(57) ABSTRACT

There is provided a production management method for steel tubes and pipes produced through a plurality of production processes, including:
  a step of machining a matrix code, which encodes tube or pipe information, in a tube or pipe end by a laser beam so that the central angle of width of the matrix code in a circumferential direction of the tube or pipe is 30° or smaller; and
  a step of reading the matrix code automatically by using a linear sensor type camera, wherein
  through reading the matrix code, the production history is managed by identifying and recording the production information and quality information corresponding to each steel tube or pipe for each tube or pipe number, and the tube or pipe information is retrievable as necessary.

6 Claims, 2 Drawing Sheets

(51) Int. Cl.
*B21C 51/00* (2006.01)
*G05B 19/12* (2006.01)

(56) References Cited

U.S. PATENT DOCUMENTS

2006/0269722 A1* 11/2006 Yamada .................. 428/116
2009/0216361 A1* 8/2009 Tanida .................... 700/159
2010/0090007 A1* 4/2010 Wang et al. ........... 235/462.11

FOREIGN PATENT DOCUMENTS

| | | |
|---|---|---|
| JP | 5-223479 | 8/1993 |
| JP | 6-84004 | 3/1994 |
| JP | 6-114576 | 4/1994 |
| JP | 8-339434 | 12/1996 |
| JP | 10-6045 | 1/1998 |
| JP | 11-23756 | 1/1999 |
| JP | 2000-317656 | 11/2000 |
| JP | 2002-269490 | 9/2002 |
| JP | 2003-56755 | 2/2003 |
| JP | 2004-157812 | 6/2004 |
| JP | 2006-35343 | 2/2006 |
| JP | 2008-250714 | 10/2008 |
| JP | 2009-30139 | 12/2009 |
| JP | 2009-301391 | 12/2009 |
| WO | 2008/015871 | 2/2008 |

* cited by examiner

PRODUCTION MANAGEMENT METHOD FOR STEEL TUBES AND PIPES

TECHNICAL FIELD

The present invention relates to a production management method for steel tubes and pipes and, more particularly, to a production management method for steel tubes and pipes, in which method a steel tube or pipe is produced through a plurality of production processes.

BACKGROUND ART

For steel tubes and pipes produced through a plurality of production processes, the treatment in each process must be performed reliably under the predetermined production conditions, and therefore management must be carried out so that the actual goods of steel tubes and pipes can be identified. In a process such as a heat treatment process in which a plurality of steel tubes and pipes are treated at the same time, the identification management of steel tubes and pipes must be carried out in lot units, and in a process such as a grinding process and a nondestructive inspection process in which steel pipes are treated on a one pipe basis, the identification management of steel tubes and pipes must be carried out on a pipe basis. Also, at the same time, it is desired to record the production information and quality information according to each steel tube or pipe in each process and to manage the production history.

In particular, for a steel pipe for nuclear power plant use, the production history data are required to be retained for a long time period. For example, a cold finished steel pipe is produced through a plurality of production processes such as rolling, heat treatment, grinding, and inspection. And in the production processes of the steel pipe after the heat treatment process, various production histories such as heat treatment temperature, amount of grinding and result of nondestructive inspection must be managed.

Conventionally, as a method for strictly managing these production histories, there have been carried out a method in which an annexed table is attached to a pallet for moving materials, a method in which a bar code manufactured by using paper is inserted in a steel pipe, a method in which a bar code is stuck to a material-protective sheet, and the like method. In these management methods, however, much labor has been spent because production management is carried out on a pipe basis in all the processes.

For a printed wiring board used in an electric circuit, the management has been carried out manually, for example, by using a name tag, label, or process control sheet on which an item number consisting of letters of the alphanumeric characters is printed. In Patent Document 1, however, there has been proposed a method in which, in the manufacturing process of printed wiring board, a code such as a bar code or matrix code is formed from a conductor by using a printing means, etching means, or the like means, and in a subsequent process, the code is read by a commercially-available code reader.

In Patent Document 2, it is pointed out that, in the control of thread cutting process of an oil-well steel pipe produced through complicated processes of heating, rolling, finishing, heat treatment, inspection, and the like, a method in which marking is performed on the outer surface of steel pipe has a possibility of disappearing of marking, and a method in which imprinting is performed on the inner or outer surface of steel pipe has a problem of flaw generation on the steel pipe, incapability of imprinting on the inner surface of a small-diameter steel pipe, or the like. As a method for solving these problems, there has been proposed a management method in which an IC tag having the production information stored therein is buried in the end face of a protector mounted in the pipe end portion to protect the pipe body or the thread part.

In Patent Document 3, as a method for identification management of steel pipe, there has been proposed a method in which an IC tag is mounted on a lightweight holder, and the holder is stuck to the inner surface of steel pipe via a bonding medium, because in the conventional method in which a permanent magnet is used to attract an IC tag stuck to a resin plate to the inner surface of pipe, the IC tag may come off by a shock.

Also, some methods in which markings are performed directly on steel tubes and pipes by using laser processing have been proposed so far.

Patent Document 4 proposes a marking method in which a laser beam is applied to the outer peripheral surface of a metallic pipe by using a scanning mirror to draw letters, figures, and the like having a depth of 0.1 μm or smaller because much labor is required in the conventional lot control method in which an identification tag on which the lot number is written down is tied up with a nylon rope.

Patent Document 5 proposes a laser marking method of a bar code, in which thin lines are formed on the surface by scanning a laser beam, and a plurality of the thin lines are arranged to form a thick line, whereby a thermal attack and chemical change in material caused by the formation of thick line are reduced. In this method, a laser beam is applied while a steel pipe is rotated, and thereby a depth of about 10 to 50 μm is formed around the entire circumference of pipe.

Patent Document 6 proposes a fuel cladding tube having an identification code, in which the identification code such as a bar code, letters, and codes consisting of a smooth surface is formed on the fuel cladding tube that has fine unevenness on the outer surface thereof and is used for a fuel rod, and irregular reflection is made incident on the material surface and regular reflection is made incident in the identification code section by carrying out control so that the lighting angle and the imaging angle are different from each other, whereby the contrast of bright and dark between the material surface and the identification code section is increased.

Patent Document 7 discloses that for a nuclear fuel rod formed from a Zircaloy alloy, an identification code consisting of a laser beam machined bar code is read with an optical means. The invention described in Patent Document 7 relates to a nondestructive measurement method of a heat-affected zone produced by the laser beam machining, and this Document describes that even if the depth of laser beam machining is 0.05 mm, a heat-affected depth of about 0.5 mm remains.

Patent Document 8 discloses a technique in which in laser marking of a nuclear fuel cladding tube, the laser power is made low, the unevenness of a mark section or a space section other than the mark section is melted by laser heat, and the difference in reflectance between the mark section and the space section is increased, whereby the identification performance is improved because if an uneven portion is present on the surface of fuel cladding tube on account of oxidation, a change in metal crystal grains, and the like caused by machining heat, there arise a problem of a decrease in cladding capability of cladding tube and the like problems.

LIST OF PRIOR ART DOCUMENTS

Patent Document

Patent Document 1: JP5-75222A
Patent Document 2: JP2008-250714A

Patent Document 3: JP2009-301391A
Patent Document 4: JP6-114576A
Patent Document 5: JP10-6045A
Patent Document 6: JP11-23766A
Patent Document 7: JP3-72296A
Patent Document 8: JP2000-317656A

DISCLOSURE OF THE INVENTION

Problems to be Solved by the Invention

The method disclosed in Patent Document 1 relates to the identification management method of a printed wiring substrate for an electric circuit, and cannot be applied to a steel pipe that does not undergo a printing or etching process as a production process.

The method disclosed in Patent Document 2 is such that a hole is formed on the pipe end face, and an IC tag is mounted and buried in the hole. However, it is difficult to apply this method to a small-diameter and thin-wall thickness steel pipe with a wall thickness of about 1 mm, such as a steel pipe for nuclear power plant use.

The method disclosed in Patent Document 3 is a method in which after an IC tag has been mounted on a lightweight holder, the holder is stuck to the inner surface of steel pipe, and the production information stored in the IC tag is controlled via an antenna. However, problems are that not only the holder cannot be stuck to the inner surface of a small-diameter pipe but also in the case where an adhesive is used on a steel pipe for nuclear power plant use, the components of the adhesive are regulated.

The method disclosed in Patent Document 4 relates to a marking method in which an identification management code such as letters and figures is drawn by a laser beam, and this Document does not at all describe a technique concerning the subsequent reading of code. In particular, the reading of letters and figures is unfavorable because misreading occurs easily. Further, in the case where many pieces of information are machined by means of letters and figures, the machining time increases, and heat generated in machining is remarkable.

The method disclosed in Patent Document 5 is a laser marking method of bar code, in which thin lines are arrangedly formed while a steel pipe is rotated at its site to form a thick line. However, a pipe rotating apparatus for marking must be installed newly, so that the equipment cost increases. In particular, for a longer-length pipe, an enormous cost is required. Also, for a bar code, when the amount of identified information is increased, the number of machined lines increases. Therefore, this method has a problem of significant heat generated ingenerated in machining.

In the method disclosed in Patent Document 6, in the case where an identification code consisting of letters and codes is used, misreading may occur when they are read. Also, in the case where a bar code is used as well, there arises a problem of heat generated in machining as described above.

The method disclosed in Patent Document 7 relates to nondestructive measurement of a heat-affected zone produced by the laser beam machining, and this Document does not describe the prevention of deterioration caused by thermal attack.

In the method disclosed in Patent Document 8, the unevenness of a mark section or a space section other than the mark section is melted by laser, whereby the identification performance of bar code is improved. However, the steel pipe used in a nuclear power plant is production-controlled so as to have a surface roughness of 1 μm or smaller (practically, 0.5 μm or smaller), and the inherent roughness is very small. Therefore, even if fine unevenness is melted by laser beam machining, the surface roughness rather increases, so that it is difficult to improve the identification performance. In the result of verification accomplished by the present inventors, a special difference has not also been recognized. Further, the machining time required for melting the unevenness becomes long, which presents a problem of a decrease in productivity.

As described above, the methods disclosed in Patent Documents 1 to 3 are less liable to be applied to a small-diameter and thin-wall thickness steel tube such as a heat exchanger tube for steam generators, and also in the methods disclosed in Patent Documents 4 to 7, a problem of heat generated in machining is left unsolved. Further, it is difficult to apply the method disclosed in Patent Document 8 to steel tubes and pipes for nuclear power plant use.

Accordingly, an objective of the present invention is to provide a method in which actual goods identification can be accomplished reliably on a pipe basis without causing serious thermal attack on the steel tubes and pipes.

Means for Solving the Problems

The present inventor examined a method for properly carrying out the identification management of steel tubes and pipes produced through a plurality of production processes and conducted studies earnestly, and resultantly obtained the following findings.

(A) In order to identify steel tubes and pipes on a pipe basis, an identification codes should be machined directly on the steel tubes and pipes by using a laser beam. If letters, symbols, or the like are used as the identification code, misreading may occur. Therefore, a code should be used. However, for a one-dimensional bar code, if the amount of information to be identified is large, a laser beam machined area increases, and there arises a problem of heat generation resulting from the increase in laser beam machined area. Therefore, there is used a two-dimensional matrix code in which the equivalent amount of information can be machined in a time period of one-fourth or less of the time period of the one-dimensional bar code.

(B) In reading the matrix codes machined on the surface of the steel tubes and pipes conveyed while rotating, if an image is captured by using an area sensor type camera, it is very difficult to regulate and control the shutter releasing timing. Also, in the case where a certain section is photographed continuously and the data thereof are analyzed, the amount of data becomes unfavorably enormous. Further, the matrix code machined on a curved surface poses a problem of incapability of reading because depending on the size, in imaging with the area sensor type camera, the whole surface is not in focus. Therefore, a linear sensor type camera is used for imaging.

The present invention has been completed on the basis of the above findings, and involves the production management methods for steel tubes and pipes described in the following (1) to (6).

(1) A production management method for steel tubes and pipes produced through a plurality of production processes, including:

a step of machining a matrix code, which encodes tube or pipe information, in a tube or pipe end by a laser beam so that the central angle of width of the matrix code in a circumferential direction of the tube or pipe is 30° or smaller; and a step of reading the matrix code automatically by using a linear sensor type camera, wherein through reading the matrix code, the production history is managed by identifying and recording the production information and quality information corresponding to each steel tube or pipe for each tube or pipe number, and the tube or pipe information is retrievable as necessary.

(2) The production management method for steel tubes and pipes according to (1), wherein in the step of reading the matrix code automatically by using the linear sensor type camera, the feed skew angle of steel tube or pipe is set at 16° or smaller.

(3) The production management method for steel tubes and pipes according to (1) or (2), wherein the method further includes a step of reading the matrix code manually by using an area sensor type camera.

(4) The production management method for steel tubes and pipes according to any one of (1) to (3), wherein the method is a production management method for a heat exchanger tube for steam generators.

(5) The production management method for steel tubes and pipes according to (4), wherein the production processes of the steel tube include a grinding process, and in the grinding process, the method further includes a step of controlling a grinding head retraction to avoid grinding the tube end portion on which the matrix code is machined.

Advantageous Effects of the Invention

According to the present invention, since the matrix code is machined directly on the end portion of the surface of the steel tube or pipe, actual goods identification can be accomplished reliably on a pipe basis without causing a thermal attack on the steel tube or pipe. Also, when the steel tubes and pipes undergo a plurality of subsequent production processes, the matrix codes are read automatically as appropriate, whereby the production information and quality information corresponding to each steel tube or pipe can be recorded, and the production history can be managed easily. Therefore, the present invention is especially suitable as a production management method for a heat exchanger tube for steam generators whose production process is complicated.

MODE FOR CARRYING OUT THE INVENTION

The production management method for steel tubes and pipes according to the present invention is a production management method for steel tubes and pipes produced through a plurality of production processes, and includes a step of machining a matrix code and a step of reading the matrix code automatically. In addition to the above steps, the production management method may include a step of reading the matrix code manually and/or a step of controlling a grinding head retraction to avoid grinding the tube or pipe end portion on which the matrix code is machined. In the following, the production method for steel tubes and pipes and each step in the production management method are described in detail.

1. Production Process of Steel Tubes and Pipes

The production process of steel tubes and pipes to which the production management method of the present invention is applied is not specifically limited. In general, however, steel tubes and pipes undergo a heat treatment process, a grinding process, and an inspection process, and thereafter the steel tubes and pipes are packaged and shipped. Since the throughput of each process is different, the production process includes a batch treatment, such as heat treatment, in which simultaneous treatment is performed in lot units, and a one pipe treatment, such as grinding/buffing and inspection, in which treatment is performed on a pipe basis. Also, a plurality of pieces of equipment have been introduced in the same process according to the throughput of equipment. Since the production information and quality information requiring the management of production history are different depending on the production process, an identification number for identifying and managing the steel tubes and pipes when the steel tubes and pipes undergo each production process is necessary.

Figure 1:
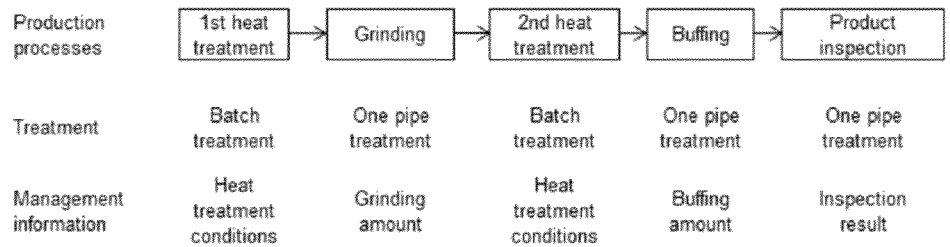
FIG. 1 is a diagram for explaining one example of the production processes for a steel pipe.

As shown in FIG. 1, the production process of a heat exchanger tube for steam generators is further complicated. After first heat treatment, grinding is performed to remove flaws induced by heat treatment or bend straightening. Also, to improve corrosion resistance, second heat treatment is performed as a sensitization treatment, and subsequently, slight buffing is generally performed immediately before the product inspection. At this time, the first heat treatment and second heat treatment are performed by batch treatment, and the grinding, buffing and inspection are performed by one pipe treatment. The heat treatment conditions in the heat treatment process, and the grinding and buffing amount in the grinding and buffing process are objects of management of production history as the production information, and the inspection result in the inspection process is an object of management of production history as the quality information.

2. Step of Machining Matrix Code

The matrix code is encoded tube or pipe information for identifying and managing steel tubes and pipes, and is machined in the end portion of the tube or pipe by using a laser beam. The tube or pipe information may be only the identification number of steel tube or pipe, or may be the identification number and predetermined production conditions. If the machining location is in the range of within 200 mm from the tube or pipe end, which is a cutting margin, the thermal attack resulting from code machining can desirably be avoided completely.

By machining the tube or pipe end portion, which is a cutting margin, the thermal attack on the product can be avoided completely; however, even the heat generation in the tube or pipe end portion may sometimes cause trouble as described below.

As described above, usually, the production process of steel tubes and pipes includes an outer surface grinding process, and grinding of about 80 to 100 μm is performed. During grinding, grinding water is generally used. By using the grinding water, the grinding amount can be assured, the grinding powder can be prevented from scattering, and the noise can be reduced. At this time, in order to prevent the grinding water from intruding into the tube or pipe inner surface from the end portion, an end plug is inserted. As the end plug, for example, a felt-like cylinder is used, and this cylinder is inserted about 100 mm deep from both of the tube or pipe ends. Therefore, if the heat generation in the end portion caused by the laser beam machining is excessive, smoke is generated from the end plug, or further the end plug burns. Therefore, especially, the tube or pipe inner surface may be contaminated by combustion impurities.

As given in Table 1, in the case where a bar code is machined, the machining time is long, and the material temperature rises after machining, so that smoke is generated from the end plug. On the other hand, in the case where a matrix code is machined, the machining time can be shortened, so that it is found that the trouble of end plug caused by heat generation does not occur.

TABLE 1

| | Machining depth (μm) | Codes | Code size | Machining time (s) | Temperature (° C.) | Readability | Affect on end plug |
|---|---|---|---|---|---|---|---|
| 1 | 7 | Matrix code | 2 × 10 mm | 40 | Room temp. | ○ | none |
| 2 | 5 | Matrix code | 3 × 10 mm | 30 | Room temp. | ○ | none |
| 3 | 3 | Matrix code | 2 × 10 mm | 25 | Room temp. | Δ | none |
| 4 | 7 | Bar code | width: 3 mm | 155 | 145 | ○ | fuming |
| 5 | 7 | Bar code | width: 4 mm | 190 | 165 | ○ | fuming |
| 6 | 7 | Bar code | width: 5 mm | 220 | 190 | ○ | fuming |
| 7 | 5 | Bar code | width: 3 mm | 125 | 120 | Δ | fuming |
| 8 | 5 | Bar code | width: 4 mm | 155 | 140 | Δ | fuming |
| 9 | 5 | Bar code | width: 5 mm | 190 | 165 | Δ | fuming |

The location in production process in which the step of machining the matrix code is provided is not specifically limited. However, since in and after the grinding process in which one pipe treatment is started, the management of production information and quality information on a pipe basis is necessary as shown in FIG. 1, it is preferable that the matrix code be machined after or simultaneously with the grinding.

Figure 2:
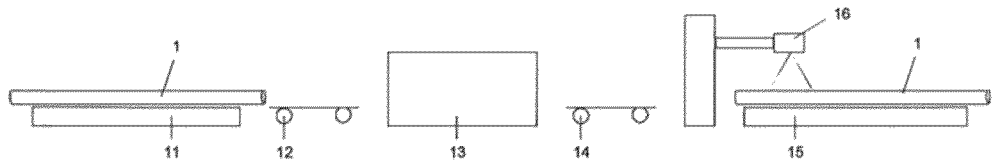
FIG. 2 is a schematic view showing one example of a step of machining a matrix code.

In this case, the code machining step can be performed, for example, pursuant to the procedure as shown in FIG. 2. A steel pipe 1 charged onto an inlet table 11 of the grinding process is conveyed while being rotated, and passes successively through an inlet conveyor 12, a grinding apparatus 13, and an outlet conveyor 14. The grinding amount at this time is not defined especially. However, it is preferable that grinding of about 100 μm in outside diameter be performed. The ground steel pipe 1 comes to a standstill on an outlet table 15, and the matrix code is machined by using a laser beam machine 16. At this time, the pipe information is given, and also the production information concerning the outer surface grinding amount corresponding to each steel pipe is recorded. With respect to the conveying direction, the matrix code may be machined on the front end side of steel pipe or on the rear end side. Alternatively, the matrix code may be machined on both end sides of steel pipe.

3. Step of Automatically Reading Matrix Code

The matrix code having been machined on the steel tube or pipe surface by the above procedure is read automatically as appropriate when the steel tube or pipe passes through each production process. Thereby, the actual goods identification of steel tube or pipe is accomplished, and the tube or pipe information is retrieved as necessary. Also, at the same time, the production information and quality information corresponding to each steel tube or pipe are recorded, whereby the production history can be managed.

Figure 3:
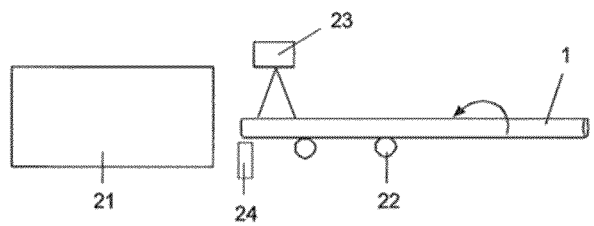
FIG. 3 is a schematic view showing one example of a step of automatically reading a matrix code.

The automatic reading can be performed before all or some of the production processes. FIG. 3 is a schematic view showing a step of automatically reading the matrix code immediately before the buffing process. The steel pipe 1 placed on the inlet side of a buffing apparatus 21 is conveyed while being rotated by transfer rollers 22. At this time, the code can be read by picking up the image by using a linear sensor type camera 23 installed above the rotating steel pipe 1. The matrix code has been machined in the minimum area in some portion in the circumferential direction of steel pipe. Therefore, when the linear sensor type camera 23 used for imaging is fixedly arranged, the steel pipe must be rotated to capture image around the entire circumference of pipe. Since the buffing process is carried out while the steel pipe is rotated, the linear sensor type camera 23 is desirably arranged immediately before the buffing process.

As shown in FIG. 3, the automatic reading using the linear sensor type camera 23 can be performed by imaging for a certain time period when the pipe end of the conveyed steel pipe is detected by a pipe end detection sensor 24. The imaging time period is not specifically limited. However, it is preferable that the imaging time period be made a short time period of within 2 seconds, which is a time period in which the pipe end portion passes through, and the image information to be processed be made at a minimum.

Figure 4:
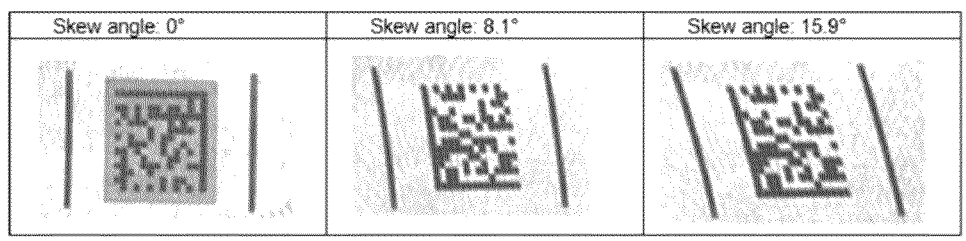
FIG. 4 shows imaging examples of matrix codes obtained by using a linear sensor type camera.

Since the steel pipe has a feed skew angle because of advancing while being rotated, the image obtained by the linear sensor type camera is distorted as shown in FIG. 4. However, it has been found that if the skew angle is at least 16° or smaller, the code can be automatically read almost reliably.

4. Step of Manually Reading Matrix Code

In some cases, it is desired to add information on only a specific steel tube or pipe, such as a steel pipe that is judged to be unacceptable in the inspection process, midway in the production process. At this time, if the tube or pipe information is manually inputted by operating, for example, a keyboard, there may be a mistake such as an input error. Therefore, it is preferable that the matrix codes machined on the surfaces of the tubes and pipes be read manually by using a camera.

The manual reading of the matrix code is performed on the stationary steel tube or pipe. Therefore, an area sensor type camera is preferably used. For the matrix code machined on a curved surface, it is impossible that the whole surface is brought into focus depending on the size, so that the matrix code machined on a curved surface cannot be read in some cases. However, as the result of reading test in which matrix codes with various widths were machined on steel pipes having various diameter, it has been found, as shown in Table 2, that if the central angle of the width of the matrix code in a circumferential direction of the pipe is 30° or smaller, the matrix code can be read by using the area sensor type camera. In the automatic reading using the linear sensor type camera, all of the matrix codes having been tested could be read.

TABLE 2

| Width of codes (mm) | Reading | | Central Angles of codes (°) |
| --- | --- | --- | --- |
| | Automatic | Manual | |
| $15.9 | 4 | ○ | ○ | 28.8 |
| | 5 | ○ | x | 36 |
| | 7 | ○ | x | 50.5 |
| | 10 | ○ | x | 72.1 |
| $19 | 4 | ○ | ○ | 21.4 |
| | 5 | ○ | ○ | 30.1 |
| | 7 | ○ | x | 42.2 |
| | 10 | ○ | x | 60.3 |
| $22.23 | 4 | ○ | ○ | 20.6 |
| | 5 | ○ | ○ | 25.8 |
| | 7 | ○ | x | 36.1 |
| | 10 | ○ | x | 51.6 |

Figure 5:
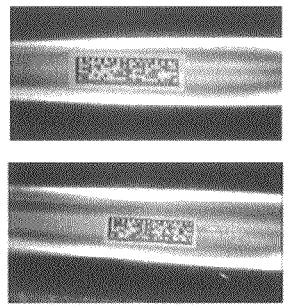
FIG. 5 shows imaging examples of matrix codes obtained by using an area sensor type camera.

Also, as shown in FIG. 5, when the steel pipe is photographed with a camera, the peripheral side surface portion of steel pipe is brightened by illumination, and the reading of this portion has been difficult. On the other hand, it has been found that the central portion is darkened, but in this portion, the unevenness of illuminance is little, so that photographing can be performed properly. If the central angle of the width of the matrix code is 30° or smaller as described above, the matrix code can be kept within the range in which the unevenness of illuminance is little. Also, as shown in FIG. 5, even in the case where the matrix code was photographed slantwise, the reading was possible. In the present invention, therefore, the central angle of the width of the matrix code to be machined is set at 30° or smaller.

Figure 6:
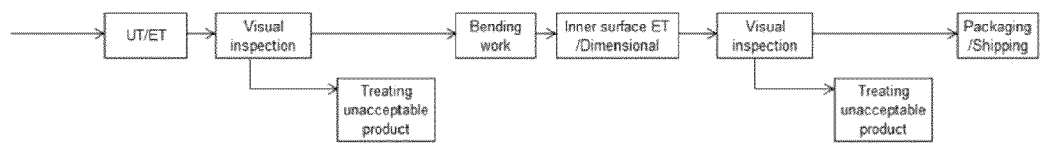
FIG. 6 is a diagram for explaining one example of the production processes for a steel pipe in and after an inspection process.

The manual reading of matrix code using the area sensor type camera can be performed, for example, in the inspection process. FIG. 6 is a diagram showing the details of each process in and after the inspection process up to shipping. After the finish of the buffing, nondestructive inspection such as ultrasonic testing (UT) or eddy current testing (ET) is carried out, and further subsequently, visual surface inspection is carried out. As shown in FIG. 6, in the nondestructive inspection process, the inspection result corresponding to each steel pipe is preferably recorded by automatic reading. In contrast, in the visual surface inspection process, to strengthen actual goods identification, all steel pipes preferably undergo actual goods confirmation by manual reading.

A steel pipe judged to be unacceptable by nondestructive inspection or visual surface inspection is recorded as an unacceptable product by manual reading, thereafter stopping being conveyed to the next process, and is treated as an unacceptable product.

As shown in FIG. 6, subsequently, the steel pipe can be subjected to bending work as necessary. At this time, to record the curvature information assigned to each steel pipe, manual reading is preferably performed before the bending work process. After the bending work, inner surface ET is performed again and dimensional inspection is carried out, and thereafter visual surface inspection is further carried out. In the inner surface ET process and the dimensional inspection process, the inspection result corresponding to each steel pipe is preferably recorded by automatic reading. In contrast, in the visual surface inspection process, to strengthen actual goods identification, all steel pipes preferably undergo actual goods confirmation by manual reading. A steel pipe judged to be unacceptable by the inspection after the bending work is recorded as an unacceptable product by manual reading in the same manner as described above, thereafter stopping being conveyed to the next process, and is treated as an unacceptable product.

The steel pipe having undergone the inspections is shipped after being packaged. In packaging, package position information is recorded by manual reading.

5. Step of Controlling a Grinding Head Retraction

In the production process of the heat exchanger tube for steam generators, the machining of matrix code is preferably performed after the grinding. However, since the buffing is further performed subsequently, the disappearance of code caused by the buffing process must be avoided.

In the buffing process, there is preferably provided a control step in which the passing-through of the tube or pipe end portion, in which the matrix code has been machined, is detected, and the grinding head is retracted. For this purpose, control is carried out so that the tube or pipe end portion is not ground. However, since the tube or pipe end portion is a cutting margin, there does not arise a problem of remaining flaw.

The above is an explanation of the production management method of the present invention, given especially by taking the production process of the heat exchanger tube for steam generators as an example. The embodiment of the present invention is not limited to the production management of the heat exchanger tube for steam generators, and can be applied to the production management of various kinds of steel tubes and pipes.

INDUSTRIAL APPLICABILITY

According to the present invention, since the matrix code is machined directly on the end portion of the surface of the steel tube or pipe, actual goods identification can be accomplished reliably on a pipe basis without causing a thermal attack on the steel tube or pipe. Also, when the steel tubes and pipes undergo a plurality of subsequent production processes, the matrix codes are read automatically as appropriate, whereby the production information and quality information corresponding to each steel tube or pipe can be recorded, and the production history can be managed easily. Therefore, the present invention is especially suitable as a production management method for a heat exchanger tube for steam generators whose production process is complicated.

REFERENCE SIGNS LIST 1. steel pipe
11. inlet table
12. inlet conveyor
13. grinding apparatus
14. outlet conveyor
15. outlet table
16. laser beam machine
21. buffing apparatus
22. transfer roller
23. linear sensor type camera
24. pipe end detection sensor

What is claimed is:

1. A production management method for steel tubes and pipes produced through a plurality of production processes, including:
   a step of machining a matrix code, which encodes tube or pipe information, in a tube or pipe end by a laser beam so that the central angle of width of the matrix code in a circumferential direction of the tube or pipe is 30° or smaller;
   a step of reading the matrix code automatically by using a linear sensor type camera, wherein the matrix code machined on the surface of the steel tube or pipe is read while rotating and conveying the steel tube or pipe; and a step of reading the matrix code manually by using an area sensor type camera, wherein through reading the matrix code, the production history is managed by identifying and recording the production information and quality information corresponding to each steel tube or pipe for each tube or pipe number, and the tube or pipe information is retrievable as necessary.

2. The production management method for steel tubes and pipes according to claim 1, wherein in the step of reading the matrix code automatically by using the linear sensor type camera, a feed skew angle of steel tube or pipe is set at 16° or smaller.

3. The production management method for steel tubes and pipes according to claim 1, wherein the method is a production management method for a heat exchanger tube for steam generators.

4. The production management method for steel tubes and pipes according to claim 3, wherein the production processes of the steel tube include a grinding process, and in the grinding process, the method further includes a step of controlling a grinding head retraction to avoid grinding the tube end portion on which the matrix code is machined.

5. The production management method for steel tubes and pipes according to claim 2, wherein the method is a production management method for a heat exchanger tube for steam generators.

6. The production management method for steel tubes and pipes according to claim 5, wherein the production processes of the steel tube include a grinding process, and in the grinding process, the method further includes a step of controlling a grinding head retraction to avoid grinding the tube end portion on which the matrix code is machined.

* * * * *